US005814723A

United States Patent [19]

[11] Patent Number: 5,814,723
[45] Date of Patent: Sep. 29, 1998

Berardinelli

[54] TIMING LIGHT ADAPTER

[76] Inventor: Ted W. Berardinelli, 3622 SE. 49th Ave., Portland, Oreg. 97206

[21] Appl. No.: 788,581

[22] Filed: Jan. 24, 1997

[51] Int. Cl.$^{6}$ .................... G01M 15/00

[52] U.S. Cl. .................... 73/116; 324/402

[58] Field of Search .................... 73/116, 117.2, 73/117.3, 118.1, 865.9; 324/402, 399

[56] References Cited

U.S. PATENT DOCUMENTS

| | | | |
|---|---|---|---|
| 3,364,418 | 1/1968 | MacCrea | 73/116 |
| 3,693,148 | 9/1972 | Pittman | 73/116 |
| 3,706,887 | 12/1972 | Bickford et al. | 250/219 D |
| 3,858,113 | 12/1974 | Pruss | 324/402 |
| 4,026,621 | 5/1977 | Korba | 324/402 |
| 4,262,527 | 4/1981 | Grover et al. | 73/116 |
| 4,321,930 | 3/1982 | Jobsis et al. | 128/633 |
| 4,380,240 | 4/1983 | Jobsis et al. | 128/633 |
| 4,384,481 | 5/1983 | Simosato | 73/116 |
| 4,594,886 | 6/1986 | Chen | 73/116 |
| 4,928,401 | 5/1990 | Murray | 33/645 |

*Primary Examiner*—George M. Dombroske
*Attorney, Agent, or Firm*—Keith A. Cushing

[57] ABSTRACT

A timing light adapter includes first and second light transmissive channels. The first light transmissive channel injects light into an engine case and illuminates a timing mark therein. The second light transmissive channel carries light reflected from the timing mark out of the engine case. The timing light adapter thereby isolates a body of oil within the engine case while allowing visibility of the timing mark without light energy interference from a timing light source.

14 Claims, 6 Drawing Sheets

TIMING LIGHT ADAPTER

BACKGROUND OF THE INVENTION

A timing light aids a mechanic when timing an internal combustion engine. In an internal combustion engine, an ignition spark within a particular combustion chamber must occur in timed relation to the position of the corresponding piston reciprocating within the combustion chamber. The ignition spark originates from an impulse of electricity generated by the ignition system and applied to a spark plug. By monitoring an appropriate portion of the ignition system, e.g., an electrical cable driving the spark plug, one determines when a particular spark plug "fires." A timing light monitors the ignition system and provides a strobing light output in timed coordination with the firing of a particular spark plug. Internal combustion engines typically include a "timing mark" on some portion of the engine mechanically coupled to the pistons. Noting the position of a timing mark provides indication of the position of a particular piston. A timing light illuminates the timing mark of the engine with its powerful strobing light output. The position of the timing mark, and therefore the piston, appears at the time the spark plug fires. As the engine runs, the position of the timing mark appears stable under the strobing timing light output. To time the internal combustion engine, a mechanic adjusts the ignition system to position the timing mark, as illuminated under the strobing light output of the timing light, to a position appropriate for that particular engine.

In certain internal combustion engines, the timing mark is located within the engine case where a body of lubrication oil resides. For example, in a Harley-Davidson (TM) V-type motor, the timing mark is located on the flywheel and the flywheel is located within the engine crank case. To time such a Harley-Davidson (TM) motorcycle, the mechanic removes a timing plug from the crank case to expose the flywheel. More particularly, the plug is removed to expose the position at which the timing mark should appear when a particular spark plug fires. The mechanic points a timing light into the timing plug aperture and notes the position of the timing mark by using a timing light as the engine runs.

FIG. 1 illustrates the prior art conventional method of timing a Harley-Davidson V-type motor 10. In FIG. 1, a timing light 12 couples electronically to motor 10 ignition (not shown) and produces a strobing light output for each occurrence of a particular ignition event, i.e., a particular spark plug firing, within motor 10. A metal timing plug 14 threadably mounts within timing plug aperture 32 and normally seals engine case 26.

Piston 16 couples mechanically to a connecting rod 18 and travels reciprocally within cylinder 20. A sprocket shaft flywheel 22 moves rotationally in coordination with reciprocal movement of piston 16. The rotational position of flywheel 22 corresponds to the position of piston 16 within cylinder 20. Flywheel 22 carries thereon a timing mark 24. Timing mark 24 arrives at a given location proximate aperture 14*a* when the spark plug associated with cylinder 20 fires. Thus, to time motor 10, timing mark 24 must be at this location when timing light 12 "strobes" timing mark 24. Within engine case 26, a body of oil directly below piston 16 lubricates motor 10.

Unfortunately, when the mechanic removes the timing plug to expose the flywheel and the timing mark during operation of the engine, the mechanic also opens the case 26 chamber directly below the piston 16. As motor 10 operates with plug 14 removed during timing, a heavy oil mist 30 emerges from aperture 32. The unfortunate mechanic must, however, be close enough to the timing plug aperture 32 to view the timing mark 24 and accomplish the task of timing motor 10. As a result, the mechanic typically receives a significant amount of oil mist 30 in his or her face and the surrounding work area receives the remainder of the heavy oil mist 30 discharge. Accordingly, timing a Harley-Davidson motorcycle can be an unpleasant task due to the oil mist 30 emerging from the motorcycle crank case. The mechanic not only endures the discomfort of oil on his or her face and hands, but also must clean the surrounding area exposed to the oil mist 30 emerging from the case 26 during timing.

One prior art solution to this problem of oil mist emerging from the crank case during a timing operation is a clear plastic plug threaded into the timing plug aperture during timing. The metal timing plug 14 is removed from case 26 and a clear plastic plug (not shown) threads into aperture 32. The theory behind this solution was to allow visibility of the timing mark while blocking ejection of oil mist from the crank case during timing. Unfortunately, this clear plastic plug does not adequately support the mechanic in timing a Harley-Davidson motorcycle. More particularly, the strobing light output of the timing light reflects off the exterior surface of the clear plastic plug and obscures any light reflected off the timing mark and returning through the plastic plug.

The clear plastic timing plug is found in many tool boxes, but rarely found in use due to its unacceptable operation. Thus, mechanics timing Harley-Davidson motorcycles have continued to endure the discomfort and additional cleaning effort associated with oil mist emerging from a Harley-Davidson crank case during timing.

Accordingly, there remains need to prevent emergence of oil the motor case, yet allow visible access to the timing mark within the case as illuminated by the strobing light output of a timing light. The subject matter of the present invention provides a solution to this dilemma.

SUMMARY OF THE INVENTION

A timing light adapter under the present invention reflects light energy off a timing mark of an internal combustion motor. First and second light transmissive bodies each provide a corresponding light transmissive channel. One light transmissive body captures light energy output from a timing light and directs the light energy onto the timing mark. The reflected light energy then travels through the second light transmissive body for observation by a person performing a timing operation. The first and second light transmissive bodies are coupled together while maintaining independent the light transmissive channels whereby the engine case remains sealed yet the timing mark remains plainly visible to an observer. Because the first and second light transmissive channels are isolated against light energy interference therebetween, and because the light energy from the timing light is captured within the adapter, the observer only sees light energy reflected from the timing mark.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
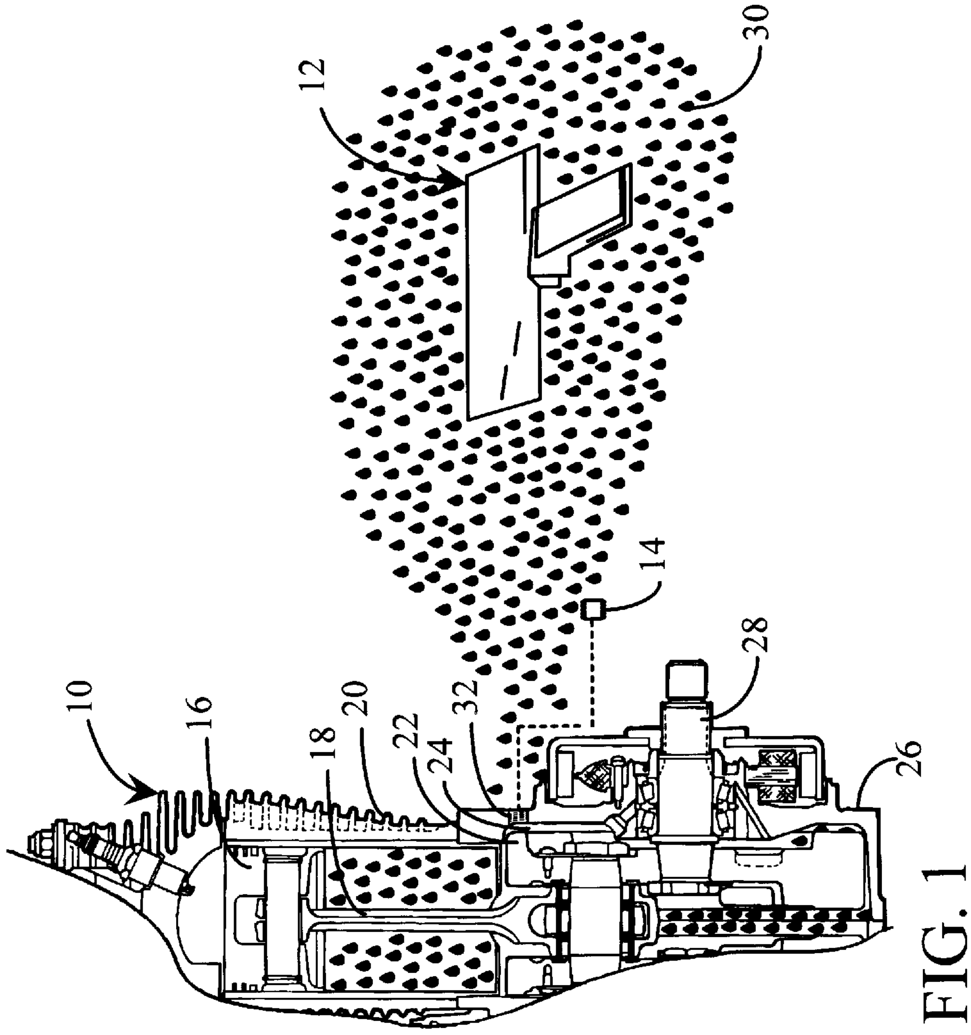
FIG. 1 (Prior Art)
FIG. 1 illustrates a prior art method of timing a typical Harley-Davidson V-type motor.
Figure 2:
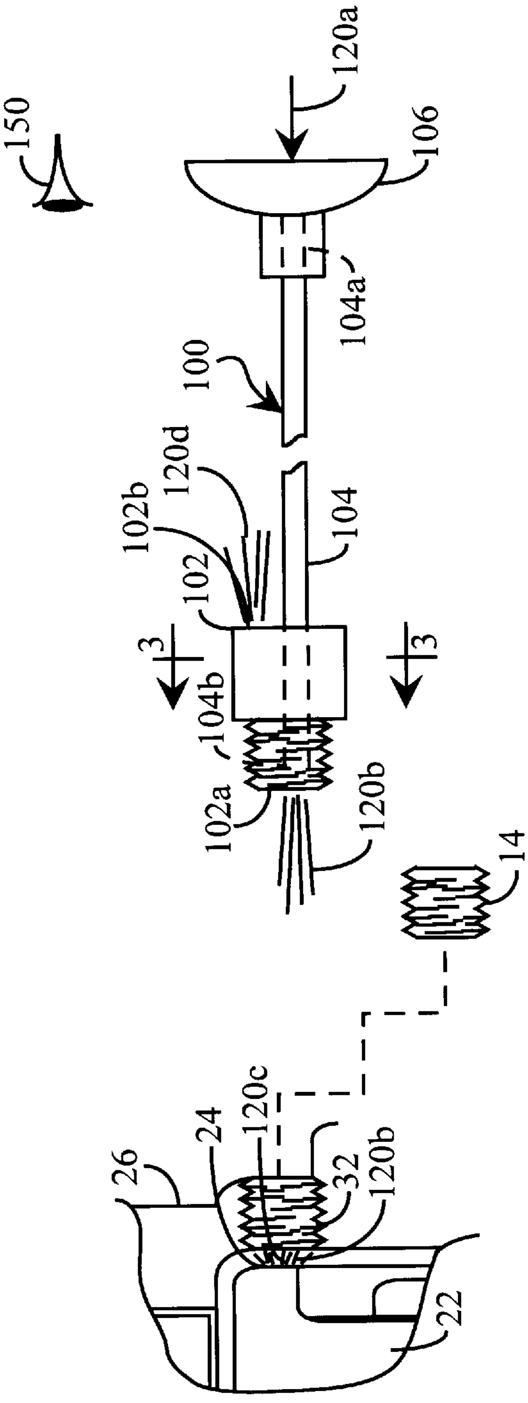
FIG. 2 illustrates a timing light adapter according to a preferred embodiment of the present invention as applied to the procedure of timing the Harley Davidson V-type motor of FIG. 1.

FIG. 2 illustrates a preferred embodiment of the present invention, a timing light adapter 100. Timing light adapter 100 includes a plastic light transmissive plug 102, a plastic light transmissive optic cable 104, and a rubber suction cup adapter 106. Both plug 102 and cable 104 are plastic, monolithic light transmissive bodies. Cable 104 inserts through a bore in plug 102 to couple together plug 102 and cable 104. In use, metal plug 14 is first removed from aperture 32 and plug 102 is threaded into aperture 32. For purposes of clarity, however, plug 102 appears in FIG. 2 as being separated from engine case 26 and aperture 32. It will be understood, however, that during a timing operation plug 102 threads into aperture 32. A light source, e.g., conventional hand-held timing light 12 (FIG. 5), injects light 120, as indicated a reference numeral 120*a,* into the distal end 104*a* of cable 104. Cable 104 thereby provides a light transmissive channel for light 120. Light 120 emerges, as indicated at reference numeral 120*b,* from the proximal end 104*b* of cable 104 and illuminates timing mark 24. Light 120 then reflects off of mark 24, as indicated at reference numeral 120*c*. Light 120*c,* as reflected off the flywheel 22 and timing mark 24, re-enters plug 102 at its proximal end 102*a* and emerges on the external side or distal end 102*b* as indicated at reference numeral 120*d.* Plug 102 thereby provides a second independent light transmissive channel for light 120.

Thus, adapter 100 provides two separate channels of light transmission and thereby avoids light energy interference from the perspective of an observer or mechanic's eye 150. The powerful and overwhelming light source 120 can only be seen by eye 150 as a reflection from timing mark 24 and flywheel 22. In other words, eye 150 only has opportunity to view the light 120*d* as a reflection, and thereby only has opportunity to see timing mark 24 as illuminated by the strobing light 120. Timing mark 24, therefore, becomes plainly visible without interference from the powerful light source. In other words, because adapter 100 provides two light transmissive channels independent with respect to light energy interference therebetween, all light energy except that reflected from timing mark 24 is isolated within adapter 100. The observer, i.e., eye 150, only sees that which is important, i.e., the timing mark 24 as illuminated by the strobing timing light output. Under prior methods of timing, the unconfined powerful light output interferes with observation of light reflected from timing mark 24.

Figure 3:
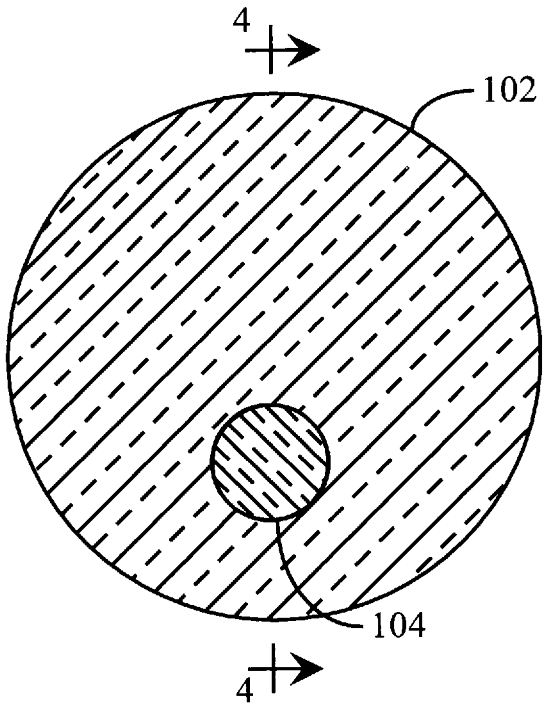
FIG. 3 is a sectional view of the timing light adapter of FIG. 2 as taken along lines 3—3 of FIG. 2.
Figure 4:
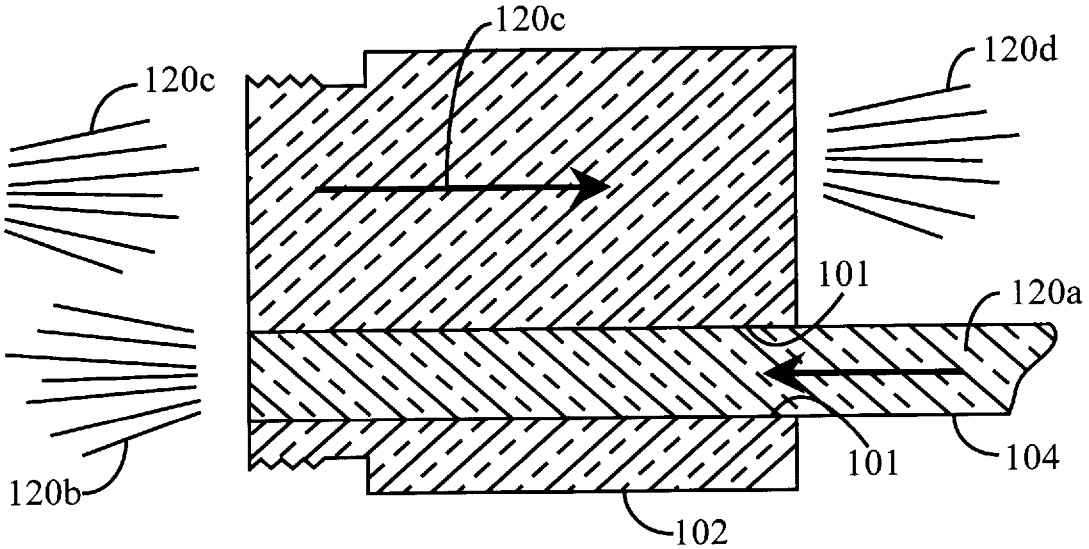
FIG. 4 is a sectional view of the plug of FIG. 3 as taken along lines 4—4 of FIG. 3.

With reference to FIGS. 3 and 4, cable 104 provides one light transmissive path into engine case 26 for light 120*a* to illuminate timing mark 24 with light 120*b.* The body of plug 102 provides another light transmissive path for light 120*c* reflecting off of flywheel 22 and out of engine case 26 making visible the light 120*d* to observer 150. Because cable 104 and plug 102 are separate light transmissive bodies, the interface 101 between cable 104 and plug 102 substantially blocks light transmission therebetween and therefore substantially isolates the two independent light transmissive channels provided under the present invention.

Figure 5:
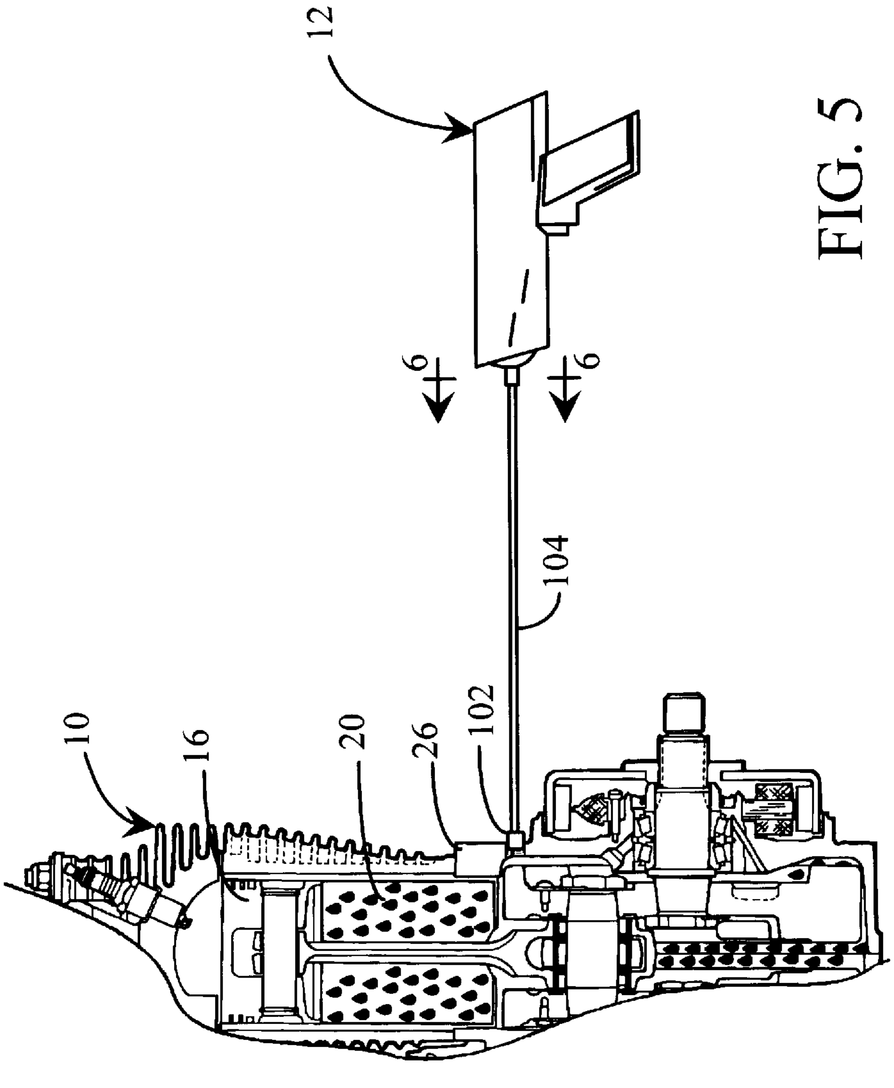
FIG. 5 illustrates the timing light adapter of FIG. 2 as coupled to a conventional timing light and the Harley-Davidson V-type motor of FIG. 1.

FIG. 5 illustrates adapter 100 as coupled to the hand-held ignition timing light 12 and motor 10. Suction cup 106 mechanically couples, i.e., by suction, to the convex lens (not shown) found on typical timing lights such as that illustrated as timing light 12. The light output of timing light 12 thereby injects directly into and is contained within cable 104. Thus, the overwhelming powerful strobing light source provided by timing light 12 remains within cable 24 and travels therein through cable 104 until emerging at the proximal end thereof and illuminating timing mark 24. The reflected light 120 from timing mark 24 enters plug 102 and is visible externally of case 26 by observer 150. In this manner, the observer 150 can see the reflected light without interference from the powerful light source provided by timing light 12.

Figure 6:
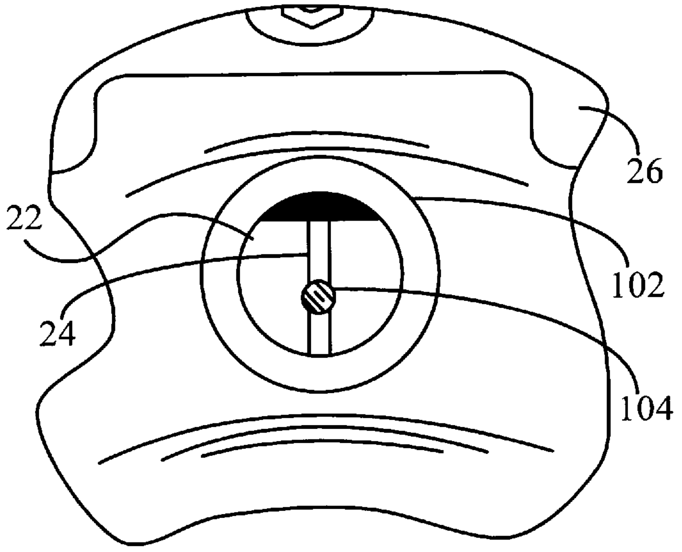
FIG. 6 illustrates a mechanic's view during timing of the Harley-Davidson V-type motor as taken generally along lines 6—6 of FIG. 5.

FIG. 6 illustrates generally the view provided by adapter 100 from the perspective of eye 150. As can be seen in FIG. 6, timing mark 24 is plainly visible through plug 102 by virtue of light reflected from timing mark 24. Important to note, because plug 102 seals case 26, no mist 30 emerges from case 26 and the mechanic enjoys a good view of timing mark 24 without exposure to any undesirable engine oil emissions.

While illustrated herein as an adapter to a conventional timing light, the present invention may be applied to a dedicated timing light device (not shown) including a cable 104 carrying its output and plug 102 attached at a distal end thereof. The advantage of an adapter 100 as illustrated herein lies in its ability to be used with pre-existing hand-held timing lights. In this manner, the timing light 12 remains in service for other, i.e., conventional, uses.

Thus, an improved method and apparatus for timing an internal combustion engine has been shown and described. While illustrated with respect to a particular type of internal combustion engine, the subject matter of the present invention may be applied to any engine where a timing mark is contained within an oil-bearing cavity of the internal combustion engine and need exists to seal the oil-bearing cavity, i.e., prevent escape of oil, during a timing operation.

It will be appreciated that the present invention is not restricted to the particular embodiment that has been described and illustrated, and that variations may be made therein without departing from the scope of the invention as found in the appended claims and equivalents thereof.

What is claimed is:

1. A timing light adapter for reflecting light energy off a timing mark of an internal combustion motor, said timing light adapter comprising:
   - a first light transmissive body having a proximal end and a distal end, said light transmissive body defining a first light transmissive channel carrying light energy between said proximal and distal ends thereof; and
   - a second light transmissive body having a proximal end and a distal end, said second light transmissive body defining a second light transmissive channel carrying light energy between said proximal and distal ends thereof, said first and second light transmissive bodies being coupled together while maintaining said first and second light transmissive channels substantially independent of light energy interference therebetween whereby, upon positioning said proximal end of said first light transmissive body adjacent said timing mark and upon positioning said proximal end of said second light transmissive body adjacent said timing mark, light energy injected into said distal end of one of said first and second light transmissive channels travels therealong, emerges at said proximal end of said one of said first and second light transmissive channels, strikes said timing mark, reflects off said timing mark, enters said proximal end of the other one of said first and second light transmissive channels and travels therealong, and emerges from said distal end of said other one of said first and second light transmissive channels, said first and second light transmissive bodies as coupled together providing a plug for insertion into an engine case of said motor to seal said case against escape of oil within said case while said motor operates.

2. An adapter according to claim 1 wherein said first light transmissive body is a plug adapted for threadably engaging a engine case of said motor and said second light transmissive body is an elongate body passing through said first light transmissive body.

3. An adapter according to claim 2 wherein said second light transmissive body is adapted to receive at its distal end a source of light energy.

4. An adapter according to claim 1 wherein said one of said first and second light transmissive bodies includes an attachment device for coupling to a conventional hand-held timing light.

5. An adapter according to claim 4 wherein said attachment device comprises a suction cup adapted for mechanically coupling to a convex lens portion of a conventional hand-held timing light.

6. A timing light adapter for use in conjunction with an internal combustion motor including a timing mark, said timing light adapter comprising:

a first light transmissive body providing a first light transmissive channel, said first light transmissive body being adapted for mounting to the internal combustion motor adjacent the timing mark, said first light transmissive body having a proximal portion adjacent said timing mark when said first light transmissive body mounts to the motor said first light transmissive body threadably attaching to a timing plug aperture of said internal combustion motor to seal said motor against escape of oil therein; and a second light transmissive body providing a second light transmissive channel, said second light transmissive body being coupled to said first light transmissive body whereby said first and second light transmissive channels are substantially independent without substantial light energy interference therebetween, said second light transmissive body having a proximal portion adjacent said timing mark when said first light transmissive body is mounted to the motor, one of said first and second light transmissive bodies being adapted to receive light energy at a distal portion thereof and deliver by way of its associated light transmissive channel said light energy to its associated proximal end whereby said light energy reflects from said timing mark, enters the associated proximal end of the other one of said first and second light transmissive bodies and emerges from a distal end of the other one of said first and second light transmissive bodies.

7. An adapter according to claim 6 wherein said one of said first and second light transmissive bodies includes an attachment device for coupling to a conventional hand-held timing light.

8. An adapter according to claim 7 wherein said attachment device comprises a suction cup adapted for mechanically coupling to a convex lens portion of a conventional hand-held timing light while allowing introduction of light energy output from said hand-held timing light via said convex lens into said one of said first and second light transmissive bodies.

9. In combination, an internal combustion motor including a case containing a body of oil, a timing mark indicating a position for a piston of said motor, an aperture in said case adjacent said timing mark, and a timing plug engagable within said aperture to seal said body of oil within said case; and a timing light adapter including first and second light transmissive channels, said first and second light transmissive channels being substantially independent of light energy interference therebetween, said adapter being engagable within said timing plug aperture to seal said body of oil within said case whereby light energy injected into said first light transmissive channel travels along said first light transmissive channel, emerges from said first light transmissive channel, strikes said timing mark, reflects from said timing mark enters said second light transmissive channel, travels along said second light transmissive channel, and emerges from said light transmissive channel to provide indication of said piston position at the time of said light energy reflecting from said timing mark.

10. A combination according to claim 9 further comprising a hand-held timing light providing said light energy into said timing light adapter.

11. A combination according to claim 9 wherein said light adapter comprises a light transmissive plug threadably engaging said timing plug aperture, a fiber optic cable passing through a bore in said plub, and a suction cup at a distal end of said cable.

12. A combination according to claim 11 wherein said suction cup is adapted to mechanically couple to a convex lens portion of a hand-held timing light providing said light energy into said timing light adapter.

13. A combination according to claim 9 wherein said plug is a monolithic platic light transmissive material.

14. A combination according to claim 9 wherein said cable is monotlithic plastic light transmissive material.

* * * * *